United States Patent
Williams

[19]

[11] Patent Number: 5,892,865
[45] Date of Patent: Apr. 6, 1999

[54] PEAK LIMITER FOR SUPPRESSING UNDESIRABLE ENERGY IN A RETURN PATH OF A BIDIRECTIONAL CABLE NETWORK

[75] Inventor: Thomas H. Williams, Longmont, Colo.

[73] Assignee: Cable Television Laboratories, Inc., Louisville, Colo.

[21] Appl. No.: 877,461

[22] Filed: Jun. 17, 1997

[51] Int. Cl.[6] .................................................. G02B 6/28
[52] U.S. Cl. ........................... 385/24; 359/115; 359/158; 359/161; 359/162
[58] Field of Search .................................. 385/15, 24, 27; 359/113–115, 118, 119, 123–125, 127, 135–137, 154, 158, 162, 164–167, 161; 455/4.2, 5.1, 63, 296, 307–311

[56] References Cited

U.S. PATENT DOCUMENTS

| | | | |
|---|---|---|---|
| 5,153,763 | 10/1992 | Pidgeon | 359/125 |
| 5,430,569 | 7/1995 | Blauvelt et al. | 359/162 |
| 5,570,219 | 10/1996 | Shibutani etal. | 359/125 |
| 5,719,867 | 2/1998 | Borazjani | 370/436 |
| 5,745,836 | 4/1998 | Williams | 455/5.1 |

OTHER PUBLICATIONS

Published in the Proceedings of SPIE under the title of Broadband Access Systems, vol. 2917, p. 12, in a conference of Nov. 19–22, 1996 by Thomas Williams, "Plant Architectures for . . . HFC Networks", 9 pages.

*Primary Examiner*—John D. Lee
*Attorney, Agent, or Firm*—Duft, Graziano & Forest, P.C.

[57] ABSTRACT

A system for preventing the distortion of data signals in a return frequency band by a laser on a return path of bidirectional communication network. The distortion of data signals is prevented by minimizing strong noise energy in the return band. The return frequency band is divided into a lower return frequency band and an upper return frequency band. The lower return band contains frequencies overlapping a noise floor with strong noise signals. The splitting of the upper and lower return frequency bands allows the upper return frequency band to be unaffected by the strong noise signals. The distortion by the strong noise signals on data signals at adjacent frequencies is minimized by transforming signals in the lower return frequency band to another form of signals that are not affected by strong noise energy.

20 Claims, 2 Drawing Sheets

PEAK LIMITER FOR SUPPRESSING UNDESIRABLE ENERGY IN A RETURN PATH OF A BIDIRECTIONAL CABLE NETWORK

FIELD OF THE INVENTION

The present invention relates to the suppression of noise and other undesirable energy from signals transmitted from a remote point to a headend of a bidirectional communication network. More particularly, the invention relates to the limiting of the amplitude of noise signals at a fiber optic receiver prior to transmitting the signals to the headend with a laser.

PROBLEM

Existing cable networks typically include a bidirectional communication path between a network headend and a plurality of remote points. An example of a bidirectional communication path is a single coaxial cable carrying broadband Radio Frequency (RF) signals in two directions. The headend transmits signals to the remote points in a first, "forward," or "downstream" direction. A second, "return," or "upstream" direction carries signals from the remote points to the headend. The cable carries the signals in the two directions by dividing the frequency spectrum into two frequency bands. Signals are transmitted by the headend to the remote point in a forward frequency band of about 54–750 MHZ, the remote point transmits signals to the headend in a return frequency band of about 5–40 MHZ. Signals transmitted by the headend typically enjoy good integrity because the headend delivers a high quality signal from a controlled source. These high quality signals in the forward frequency band of 54–750 MHZ are distinguishable from return signals having undesirable energy and a noise floor at about 5–30 MHZ. Noise is not a concern in signals originating from the headend.

Remote points, such as private homes, are typically uncontrolled noise producing sources. Each remote point typically contains multiple origination points of undesirable energy, including but not limited to mechanically switched inductive loads, citizen band radio transmitters, and devices using radio signals, such as garage door openers, remote controls, and security systems. Undesirable energy or noise generated by origination points at remote points enters the network through weak points in the network. Weak points include but are not limited to unshielded, improperly connected, corroded, broken, or cut cable at the remote point. The multiple origination points at the remote points and the large number of weak points combine to allow large amounts of undesirable energy to enter the network near a remote point.

The noise that enters the network near a remote point is generally short in duration and exceedingly strong in amplitude. Generally, the noise is also stronger in a noise band at the low end of the return frequency band at or about 5–15 MHZ. Noise energy in the noise band may have amplitudes sufficiently strong to distort data signals in other frequencies of the return band by over-driving active devices such as amplifiers. The problem is that the strong noise energy and data signals are mixed as the signals propagate from a remote point to the headend. The mixing of the signals in the return frequency band degrades the signal quality of the return frequency band signals. If the deterioration of the data signals is too great, error correction techniques may not be able to recover the data and retransmitting the last data signals or the errored packets is necessary.

Lasers are typically used to convert the return RF signals to optical signals that are transmitted to the headend. It is a particular problem that the lasers frequently distort the signals at a much lower amplitude than other components of the communication network. Thus, data signals in the return band are more susceptible to distortion by the lasers when noise is mixed with the data signals. This is especially true of inexpensive lasers, such as a Fabry-Perot laser, which have low amplitude thresholds for signal limiting as compared to other lasers.

One solution to the problem of distortion of the signal by the lasers has been to limit all signals in the return frequency band. However, the limiting of all signals in the return frequency band has a similar effect as the limiting by a laser, since it causes the data signals to be distorted when noise is present. Thus, peak limiting all of the signals in the return band is not a viable solution to this problem.

SOLUTION

The present invention solves the above and other problems by providing a peak limited bidirectional cable communication network having a headend which transmits signals in a forward frequency band on a forward path to remote points. Signals containing both data and noise are transmitted from the remote points of the network on a return path to a network headend or hubsite. One type of bi-directional network is a hybrid fiber coax network which carries signals over coaxial cables part of the distance and over fiber optic cable for the balance of the distance. The return path contains a laser transmitter for converting RF signals in a return frequency band of 5–40 MHZ to fiber optical signals. The converted optical signals are transmitted over a fiber optical path to the headend. The present invention minimizes the distortion of data signals by the laser transmitter.

It is known that most noise energy is continual in a noise frequency band of 5–15 MHZ. The present invention isolates the noise band of 5–15 MHZ by separating the return band into a lower return frequency band of 5–15 MHZ containing most of the noise energy and an upper return frequency band 15–40 MHZ. The isolated noise signals, even if exceedingly strong, do not distort upper return frequency band data signals. Therefore, the data signals in the upper return band of 15–40 MHZ are not distorted by a laser.

The present invention also minimizes the distortion of data signals in the lower return frequency band by noise energy. The minimizing of the distortion is done in three different manners by three separate embodiments. In a first embodiment, signals in the lower return band of 5–15 MHZ are peak-limited after being separated from the upper return frequency band. The limiting of the signals in the lower return band of 5–15 MHZ prevents the distortion of data signals in the upper return band of 15–40 MHZ by limiting every signal in the lower band to a maximum peak amplitude. Noise that has been limited does not distort data signals in the lower band. After the lower band of 5–15 MHZ has been limited, the low return band signals cannot be summed back with signals in the upper band of 15–40 MHZ, since the summation of the limited signals would cause harmonic distortions. To avoid the harmonic distortions, the peak-limited signals in the lower return band of 5–15 MHZ are converted to signals in a third frequency band, such as 60–70 MHZ. These signals in the third band are summed with the upper return band signals of 15–40 MHZ. The third band of 60–70 MHZ does not overlap the upper return band of 15–40

MHZ. After the signals in the upper and third bands are summed, the signals are applied to an analog laser transmitter, are converted to optical signals, and are transmitted to the headend by the analog laser transmitter.

Instead of peak limiting, a second embodiment of the invention applies the lower return band signals to an analog to digital converter (A/D). Since digital signals are peak limited, high amplitude signals are not limited by a digital laser transmitter. The digital signals are then converted to optical signals and transmitted to the headend by the digital laser transmitter. Signals in the upper return frequency band are transmitted to the headend by a separate analog laser transmitter.

A third embodiment of the invention uses an A/D converter to convert the signals in the lower return frequency band to digital signals. However, instead of transmitting the signals with a digital laser transmitter, the digitalized lower return band signals are modulated as RF signals in a QAM frequency band with a QAM modulator. The conversion of the RF signals to digital signals by the A/D converter peak limits the high amplitude signals in the lower frequency band. The QAM modulator then changes the digital signals to RF signals in the QAM frequency band with the high amplitude noise signals being represented as signals within a normal amplitude range. The signals in the QAM frequency band are then summed with the signals in the upper frequency band. Both frequency bands are then transmitted to the headend by an analog laser.

The peak-limiting of return band signals by lasers allows the signals in the return frequency band to be operated with stronger amplitudes without additional head room allowance for the laser limiting. A headroom allowance consists of limiting of the amplitude of the data signals to a specified range to prevent the distortion of the data signals by strong noise energy. Since the present invention eliminates the concern of distortion by strong noise signals, the specified amplitude range for data signals can be greater.

The present invention allows data to be transmitted in the lower end of the return band of 5–15 MHZ. Instead of blocking all signals in the lower end of the return frequency band to eliminate strong noise signals, the effects of the strong noise energy are minimized on data signals of both the upper and lower return bands allowing the entire return band to be used to carry data. Further, data signals transmitted by the laser to the headend contain fewer bit errors since limiting by the lasers does not occur.

The present invention also allows a less expensive laser to be used in the cable network. Inexpensive lasers have lower thresholds for limiting signals. Since strong noise signals do not affect data signals at other frequencies, the threshold of the inexpensive laser does not limit data signals in other frequencies. Therefore, the lower limiting threshold is not a concern. Further, the lasers receive less stress from surges in the received signals. The present invention allows the inexpensive laser to perform as well as more expensive lasers for network use.

The present invention therefore advances the art of cable network communications by improving the integrity of data signals from the remote points to the headend.

DETAILED DESCRIPTION

Figure 1:
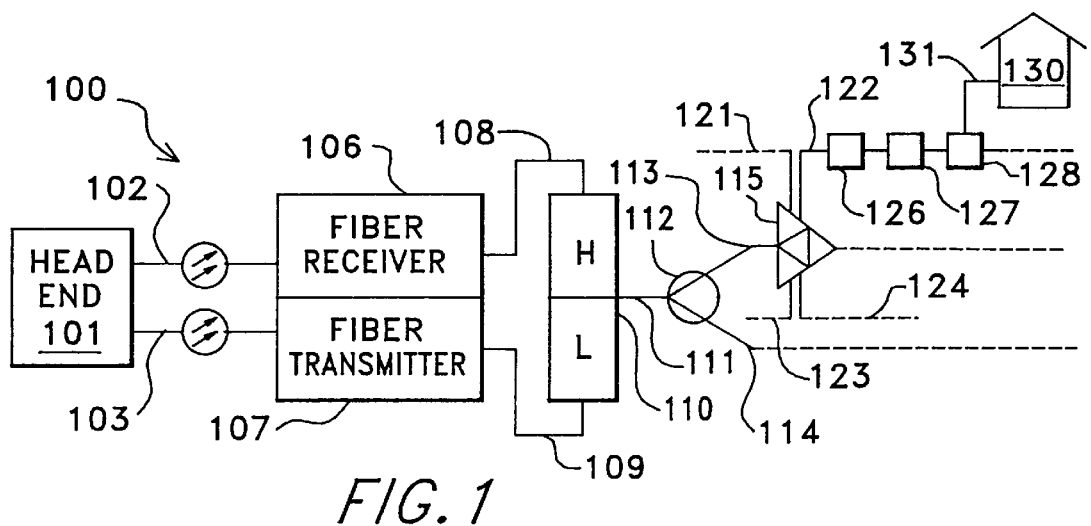
FIG. 1 illustrates a hybrid fiber coax bidirectional cable communication network.

FIG. 1 illustrates a bidirectional cable communication network 100 which has a hybrid fiber coax tree and branch topology commonly found in the industry. Headend 101 is the origination point for signals transmitted in a forward direction and the termination point for signals transmitted in a return direction. Headend 101 transmits optical signals along fiber path 102 to fiber receiver 106. Fiber receiver 106 converts the optical signals to electrical radio frequency (RF) signals in a forward frequency band. The RF signals are transmitted over forward path 108 to diplex filter 110. The RF signals received by diplex filter 110 over path 108 are filtered to allow only signals in the forward band to be applied to coaxial cable 111 in the forward path. RF signals in the return frequency band received over coaxial cable 111 are filtered by diplex filter 110 and applied to fiber transmitter 107 via path 109.

Coaxial cable 111 has one end connected to diplex filter 110 and another end connected to directional coupler 112. A directional coupler is a commonly used device that splits and joins branches in directional cable network 100. Directional coupler 112 splits the signals in the forward band received over coaxial cable 111 so that all of the information in the RF signals from headend 101 is applied to coaxial cables 113 and 114. RF Signals in the return frequency band carried by coaxial cables 113 and 114 are joined at directional coupler 112 and applied to coaxial cable 111. Directional coupler 112 can also include signal amplifiers or repeaters depending on the distance between the bidirectional coupler 112 and the headend 101.

Coaxial cable 113 is representative of the branches of network 100. The forward path signals are applied to amplifier/coupler 115 by coaxial cable 113. Amplifier/coupler 115 amplifies the signals received in both the forward frequency band and return frequency band. The signals transmitted from headend 101 are also applied to separate branches, such as coaxial cables 121–124 by amplifier/coupler 115.

Coaxial cable 122 is representative of a branch from amplifier/coupler 115. Network taps 126–128 along coaxial cable 122 are typical network taps connecting remote point user sites to network 100. A remote point is a user site, such as a residence 130 and the drop line, such as drop line 131, connecting the user site to the network tap 128. Signals in the forward band are applied to drop line 131 by network tap 128. Drop line 131 carries the signals in the forward frequency band to residence 130.

A remote point, such as residence 130, can transmit data signals in the return frequency band of 5–40 MHZ to headend 101. The data signals are applied to drop line 131. Noise energy lasting for a short duration and having a high amplitude is introduced into network 100 at weak points in residence 130 and drop line 131. This noise energy creates a noise floor in a noise frequency band of 5–30 MHZ. The strongest noise energy occurs in the lower end of the noise band at 5–15 MHZ. The noise band of 5–30 MHZ overlaps the return band of 5–40 MHZ and the noise energy in the noise band distorts signals in the return band carried by drop line 131 to network tap 128.

Network tap 128 applies noise and data signals in the return band of 5–40 MHZ to coaxial cable 122 which carries the return band signals to amplifier/coupler 115. The return band signals carried by coaxial cable 121, 122, 123 and 124 are joined by amplifier/coupler 115 and applied to the directional coupler 112 over coaxial cable 113. Directional coupler 112 joins the return path signals from coaxial cables 113 and 114. The joined signals are applied to coaxial cable 111 which carries the return band signals diplex filter 110. Signals in the return band of 5–40 MHZ pass through diplex filter 110 to return path 109 and over to fiber transmitter 107.

Figure 2:
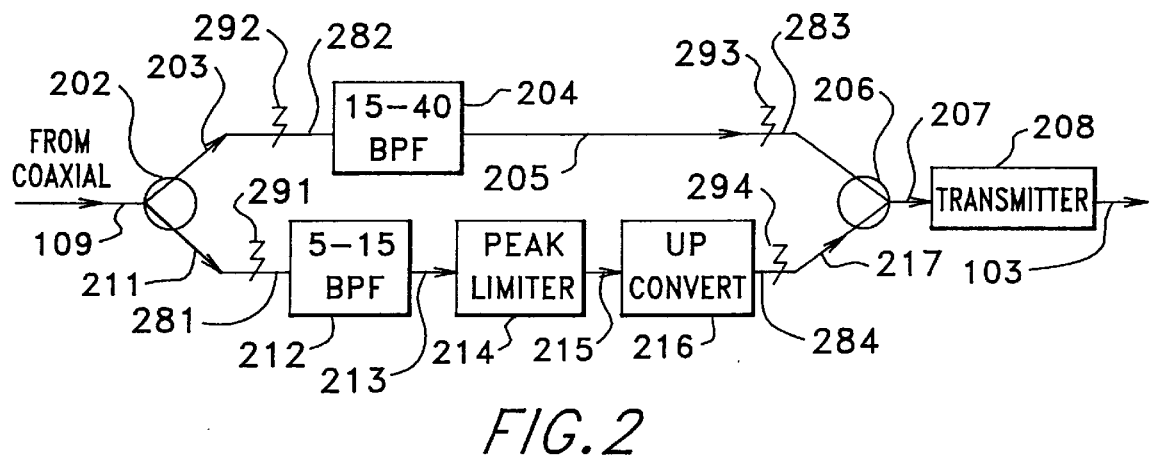
FIG. 2 illustrates a first embodiment of the present invention comprising an analog laser transmitter.

The present invention includes laser transmitter 107. FIG. 2 illustrates a first embodiment of the invention in which splitter 202 receives signals over return path 109 and splits the return frequency band signals of 5–40 MHZ into a lower return frequency band of 5–15 MHZ and an upper return frequency band of 15–40 MHZ. Pad 291 receives the lower return band signals via path 211 and prevents energy loss form splitter 202. The lower return band is applied to filter 212 via path 281. A peak-limiter 214 receives the filtered signals in the lower return frequency band via path 213 and limits the signal amplitudes to maximum and minimum values. If the signal is not stronger than the maximum value or weaker than the minimum value, the signal passes through peak-limiter 214 with a fixed gain such as unity. The limiting minimizes the effect of strong noise energy on signals in adjacent frequencies. Path 215 carries the limited signals in the lower return band of 5–15 MHZ to up-converter 216, which converts the signals in the lower return frequency band to a third frequency band of 60–70 MHZ. The signals are up-converted to avoid harmonic distortions that are created when the signals in the lower return band of 5–15 MHZ are summed with the signals in the upper return band of 15–40 MHZ. Up-converter 216 includes a converted local oscillator (not shown) and a filter to reduce both the image frequency, and spurious local oscillation signals. Pad 294 receives the third frequency band signals over path 284 and reduces the loss in signal strength caused by the filter. The signals in the third band of 60–70 MHZ are applied to combiner 206 via path 217.

Signals in the upper return band are applied by splitter 202 to pad 292 via path 203. Path 282 carries the signals from pad 292 to filter 204 which is a band pass filter. Pad 293 receives the filtered signals over path 205 and reduces the loss in signal strength caused by filter 204. Signals in the upper return band of 15–40 MHZ are applied to combiner 206 via path 283. Combiner 206 applies signals in the upper return band of 15–40 MHZ and signals in the third frequency band of 60–70 MHZ to path 207, which carries the signals to laser transmitter 208. When laser transmitter 208 receives the signals in the upper return band of 15–40 MHZ and the third frequency band of 60–70 MHZ, the RF signals are converted to optical signals. Laser transmitter 208 transmits the optical signals to headend 101 via optical path 103.

Figure 3:
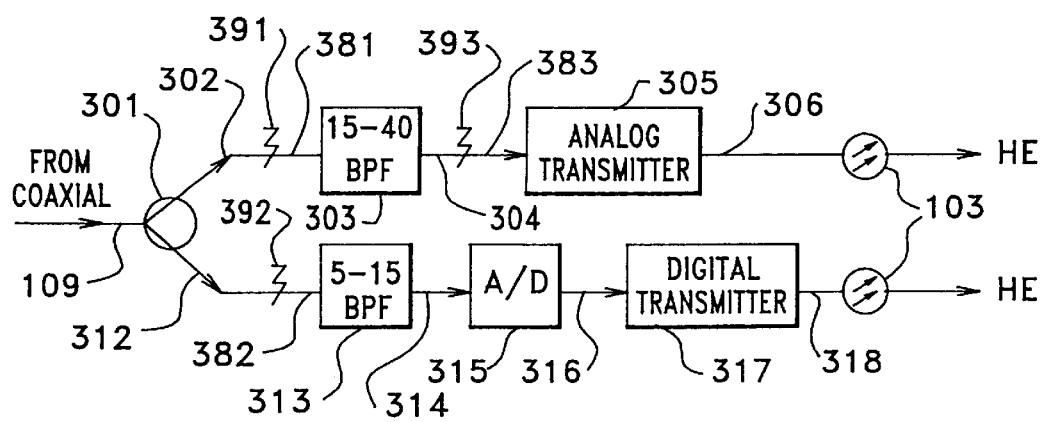
FIG. 3 illustrates a second embodiment of the present invention comprising an analog laser transmitter and a digital laser transmitter.

A second embodiment, illustrated in FIG. 3, minimizes the effect of strong noise signals in a different manner than the first embodiment of FIG. 2. Splitter 301 receives return band signals over return path 109 and splits the signals in the return band of 5–40 MHZ into a lower return frequency band of 5–15 MHZ and an upper return frequency band of 15–40 MHZ. Signals in the lower return band of 5–15 MHZ are applied to pad 392 via path 312 to reduce the loss from signal strength caused by splitter 301. Path 382 carries the lower return band signals to band pass filter 313. Only signals in the lower return frequency band of 5–15 MHZ pass through filter 313. Path 314 carries the filtered lower return frequency band signals to A/D converter 315, which converts signals in the lower return frequency band to digital signals. The digital signals are then applied to a digital laser transmitter 317 via path 316. Since the signals are in a digital form, there is no limiting by digital laser transmitter 317. Rather, limiting occurs in A/D converters which can be overdriven in a positive or negative direction. Digital laser transmitter 317 converts the digital signals to optical signals which are transmitted over optical path 318 which is part of optical path 103. Optical path 318 carries the signals to headend 101 which has the proper components for receiving and processing the optical signals from digital laser transmitter 317.

Splitter 301 applies the upper return band signals to pad 391 via path 302. Path 381 carries the upper return band signals of 15–40 MHZ to band pass filter 303. The filtered upper return band signals are applied to pad 393 over path 304. Analog laser transmitter 305 receives the upper band signals from pad 393 over path 383, and converts the RF signals in the upper return band of 15–40 MHZ to optical signals. The converted optical signals are then transmitted to headend 101 over optical path 306 which is also part of optical path 103.

Figure 4:
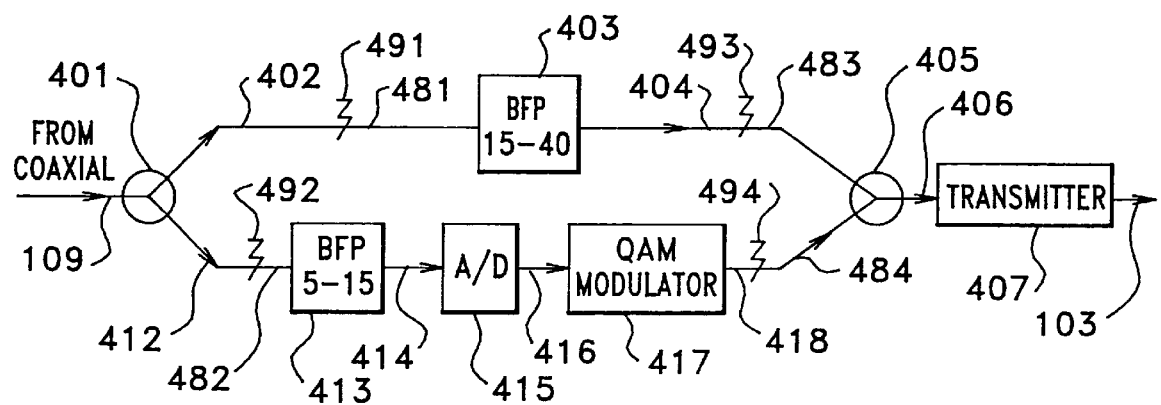
FIG. 4 illustrates a third embodiment of the present invention comprising an analog laser transmitter and a QAM modulator.

A third embodiment, illustrated in FIG. 4, converts the lower return band to digital signals. However, the network only contains analog laser transmitter 407. The third embodiment modulates the digital signals back on to a RF carrier. Signals carried by return path 109 are received splitter 401. The signals in the return frequency band of 5–40 MHZ are divided into a lower return frequency band of 5–15 MHZ and an upper return frequency band of 15–40 MHZ by splitter 401. Signals in the lower return band of 5–15 MHZ are applied to pad 492 over path 412. Path 482 carries the padded signals to band pass filter 413. Only signals in the lower return band of 5–15 MHZ pass through filter 413. Path 414 applies the filtered lower return frequency band signals to A/D converter 415, which converts signals in the lower return band to digital signals. The conversion of the lower return frequency band to digital signals changes the signals in the lower return frequency band to a form that does not cause clipping. In order to transmit the digital signals to the headend, the digital signals must be converted back to analog signals. The digital signals are applied to QAM modulator 417 over path 416. A QAM modulator is a device well known and commonly available in the communication industry that is used to transmit digital signals in RF bands. The digital signals are converted to a modulated carrier somewhere in a QAM frequency band of 50–200 MHZ, which does not overlap the upper return band of 15–40 MHZ. The signals in the QAM band represent the digital signals and thus are within an amplitude range which does not subject the signals to the limiting by analog laser transmitter 407. Path 418 applies the QAM frequency signals to pad 494 to reduce the loss in signal strength in the lower return band. Path 484 carries the signals from pad 494 to combiner 405.

Signals in the upper return band are applied by splitter 401 to pad 491 via path 402. Path 481 carries the upper return band to band pass filter 403 which allows only signals in the upper return band of 15–40 MHZ to pass to path 404. Signals in the upper return band of 15–40 MHZ are applied to pad 493 via path 404. Combiner 405 receives upper frequency band signals over path 483. The combined signals in the upper return band of 15–40 MHZ and QAM band of 50–200 MHZ are applied to path 406, which carries the signals to analog laser transmitter 407. Analog laser transmitter 407 is designed to receive signals in the upper and QAM bands over path 406. When laser transmitter 407 receives the signals in the upper band of 15–40 MHZ and QAM band of 50–200 MHZ, the RF signals are converted to optical signals. The optical signals are transmitted headend 101 via optical path 103 by laser transmitter 407.

The present invention minimizes the effect of limiting by a laser on signals in return frequency band transmitted from remote points to the headend of bidirectional cable communication network. Return band signals are divided into a lower and an upper return frequency band. The division of the signals isolates strong noise signals found in the lower return frequency band from the signals in the upper return frequency band. This prevents the strong noise energy from distorting the upper return frequency band and causing the upper return band frequency signals to be distorted by the laser and allows signals in the upper frequency band to be transmitted by the laser without being limited. The lower frequency band can be used to transmit packets of information that can be retransmitted and do not demand a high integrity.

The present invention relates to the minimizing of data errors caused by a laser limiting data signals that are being transmitted to a headend from remote points of bidirectional cable communication network. Noise signals at the lower frequencies cannot distort data signals in higher frequencies of the return band. The components of the circuitry of the present invention are individually known and widely available in the cable industry from manufacturers/distributors including, but not limited to, General Instruments, Phillips Broadband, Eagle, and Scientific Atlanta. Although specific embodiments are disclosed for example herein, it is expected that persons skilled in the art can and will design alternative circuitry for minimizing the limiting effect of the laser on signals in the return band that is within the scope of the following claims either literally or under the Doctrine of Equivalents.

What is claimed:

1. A system for minimizing the effects of peak limiting by a laser in a return path of a bidirectional cable communication network wherein a headend transmits signals in a forward frequency band to at least one of a plurality of remote points and at least one of said plurality of remote points transmits data signals in a return frequency band to said headend, said network comprising:

means at said at least one remote point for transmitting data signals in said return frequency band;

splitting means;

means for applying said transmitted data signals from said at least one remote point to said splitting means;

said splitting means being effective to divide said signals in said return frequency band into signals in a lower return frequency band and signals in an upper return frequency band;

means for minimizing the effect of peaks of strong noise signals in said lower return frequency band on data signals in adjacent frequencies;

means for applying said lower return frequency band to said means for minimizing;

said means for minimizing being responsive to said application of said lower return frequency band signals for converting said data and noise signals in said lower return frequency band to an alternate form of signals;

laser means;

means for applying said signals in said upper return frequency band to said laser means;

means for applying said signals in said alternate form of signals to said laser means; and said laser means being effective to transmit said data signals in said upper return frequency band and said signals in said alternate form to said headend.

2. The system of claim 1 further comprising:

a first filter means connected to said splitting means;

means for applying said signals in said lower return frequency band to said first filter means; and said filter means being effective for passing only signals in said lower return frequency band.

3. The system of claim 2 further comprising:

a second filter means connected to said splitting means;

means for applying said upper return frequency band to said second filter means; and said second filter means being effective for passing only said data signals in said upper return frequency band.

4. The system of claim 3 wherein said means for minimizing comprises:

an analog to digital converter;

means for applying said signals in said lower return frequency band to said analog to digital converter; and said analog to digital converter being effective for converting said signals in said lower return frequency band to digital signals.

5. The system of claim 4 wherein said means for minimizing further comprises:

a QAM modulator;

means for applying said digital signals to said QAM modulator; and said QAM modulator being effective for converting said digital signals to signals in a QAM frequency band.

6. The system of claim 5 wherein said laser means comprise:

combiner means;

means for applying said data signals in said upper return frequency band to said combiner means;

means for applying said signals in said QAM frequency band to said combiner means;

said combiner means being effective for joining said data signals in said upper return frequency band and said signals in said QAM frequency band;

means for transforming;

means for applying said joined signals to said means for transforming;

said means for transforming being effective to transform said joined signals in said upper return frequency band and said QAM frequency band to optical signals;

a laser;

means for applying said optical signals to said laser; and said laser being effective for transmitting said optical signals to said headend.

7. The system of claim 4 wherein said laser means comprises:

analog laser means;

means for applying said signals in said upper return band to said analog laser means;

said analog laser means being effective for transmitting said signals in said upper return band to said headend;

digital laser means;

means for applying said digital signals to said digital laser means; and said digital laser means being effective for transmitting said digital signals to said headend.

8. The system of claim 1 wherein said alternate form of signals is signals in a third frequency band and said means for minimizing comprises:

limiter means;

means for applying said lower return frequency band to said limiter means; and said limiter means being effective for limiting the amplitude of said signals in said lower return frequency band to a maximum and a minimum value.

9. The system of claim 8 wherein said means for minimizing further comprises:

means for up-converting;

means for applying said signals in said lower return frequency band with limited amplitudes to said means for up-converting; and said means for up-converting being effective for converting said signals in said lower return frequency band to said signals in said third frequency band.

10. The system of claim 9 wherein said laser means comprise:

combiner means;

means for applying said data signals in said upper return frequency band to said combiner means;

means for applying said signals in said third frequency band to said combiner means;

said combiner means being effective for joining said data signals in said upper return frequency band and said signals in said third frequency band;

means for transforming;

means for applying said joined signals to said means for transforming;

said means for transforming being effective to transform said joined signals in said upper return frequency band and said third frequency band to optical signals;

a laser;

means for applying said optical signals to said laser;

said laser being effective for transmitting said optical signals to said headend; and means for receiving said optical signals at said headend.

11. A method for minimizing the effects of signal limiting by a laser in a bidirectional cable communication network wherein a headend transmits signals in a forward frequency band to a remote point and said remote point transmits data signals in a return frequency band to said headend, said method comprising the steps of:

transmitting signals in said return frequency band from said remote point;

applying said transmitted signals to a first splitter;

dividing said return frequency band into signals in a lower return frequency band containing noise and data signals and signals in an upper return frequency band with said first splitter;

transforming said noise and data signals in said lower return frequency band to an alternate form of signals to minimize the effect of said noise signals on said data signals in adjacent frequencies;

applying said upper return frequency band to said laser;

applying said signals in said alternate form of signals to said laser;

transmitting said data signals in said upper return frequency band and said signals in said alternate form of signals to said headend; and receiving said upper return frequency band signals and said signals in said alternate form of signals at said headend.

12. The method of minimizing the effects of limiting by said laser in a bidirectional communication network of claim 11 further comprising the steps of:

applying said signals in said lower return frequency band to a first filter; and filtering said lower return frequency band with said first filter to pass only signals in said lower return frequency band.

13. The method of minimizing the effects of limiting by said laser in a bidirectional communication network of claim 12 further comprising the steps of:

applying said upper return frequency band to a second filter; and filtering said upper return frequency band with said second filter to pass only said data signals in said upper return frequency band.

14. The method of minimizing the effects of limiting by said laser in a bidirectional communication network of claim 13 wherein said step of minimizing comprises the steps of:

applying said lower return frequency band to a limiter; and limiting the amplitude of said signals in said lower return frequency band to a maximum and a minimum value with said limiter.

15. The method of minimizing the effects of limiting by said laser in a bidirectional communication network of claim 14 wherein said step of minimizing further comprises the steps of:

applying said signals in said lower return frequency band with limited amplitudes to an up-converter; and converting said signals in said lower return frequency band to said signals in said lower frequency band.

16. The method of minimizing the effects of limiting by said laser in a bidirectional communication network of claim 14 further comprising the steps of:

applying said data signals in said upper return frequency band to a second splitter;

applying said signals in said lower frequency band to said second splitter;

joining said data signals in said upper return frequency band and said signals in said lower frequency band with said second splitter.

17. The method of minimizing the effects of limiting by said laser in a bidirectional communication network of claim 13 wherein said step of minimizing comprises the steps of:

applying said signals in said lower return frequency band to an analog to digital converter; and converting said signals in said lower return frequency band to digital signals with said analog to digital converter.

18. The method of minimizing the effects of limiting by said laser in a bidirectional communication network of claim 17 wherein said step of minimizing further comprises the steps of:

applying said digital signals to a QAM modulator; and converting said digital signals to signals in a QAM frequency band with said QAM modulator.

19. The method of minimizing the effects of limiting by said laser in a bidirectional communication network of claim 18 further comprising the steps of:

applying said data signals in said upper return frequency band to a second splitter;

applying said signals in said QAM frequency band to said second splitter; and joining said data signals in said upper return frequency band and said signals in said QAM frequency band with said second splitter.

20. The method for minimizing the effects of limiting by said laser in a bidirectional communication network of claim 17 wherein said laser comprises an analog laser and a digital laser and said step of applying said signals to said laser comprises the steps of:

applying said signals in said upper return band to an analog laser; and applying said digital signals to said digital laser.

* * * * *